April 27, 1937.　　O. PANZNER　　2,078,871

MACHINE TOOL

Filed Aug. 31, 1934　　3 Sheets-Sheet 1

Inventor:
Otto Panzner
By [signature]
Attorney

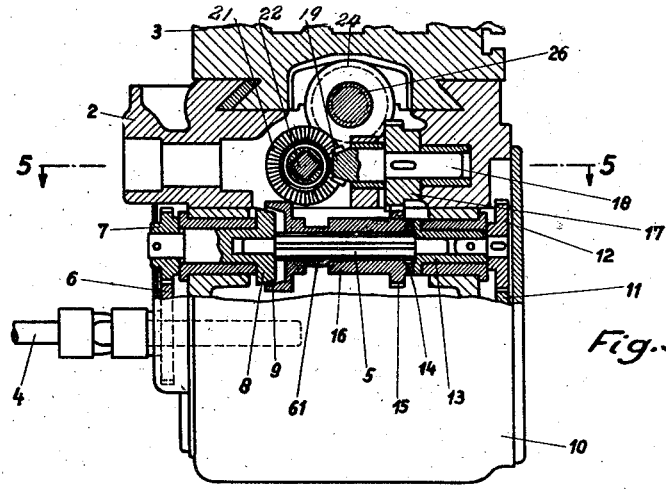
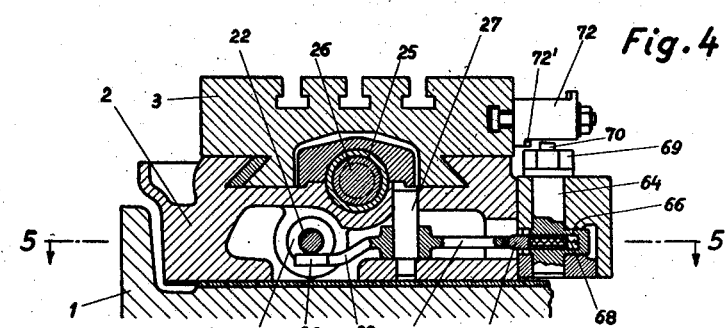

April 27, 1937.  O. PANZNER  2,078,871

MACHINE TOOL

Filed Aug. 31, 1934  3 Sheets-Sheet 3

Inventor:
Otto Panzner
By
Attorney.

Patented Apr. 27, 1937

2,078,871

UNITED STATES PATENT OFFICE 2,078,871

MACHINE TOOL

Otto Panzner, Chemnitz, Germany, assignor to Wanderer-Werke vorm. Winklhofer & Jaenicke Akt.-Ges., Schonau-Chemnitz, Germany Application August 31, 1934, Serial No. 742,345
In Germany September 4, 1933

5 Claims. (Cl. 90—21)

This invention relates to machine tools or the like in which a device for changing the speed of the work table and a device for reversing the direction of motion of the table are both controlled by a single common control lever.

The object of the invention is to provide means for controlling the speed and direction of the work table, which is simple and inexpensive to produce, simple to operate and reliable, and which takes up little space. According to the invention, these objects are attained by means of two setting members operatively connected with the control lever and said setting members being arranged for moving one of the devices which change the speed and the direction of motion of the work table to the same operative position during the control lever being actuated in different directions.

A typical construction embodying the invention is illustrated by the accompanying drawings, in which—

Fig. 3 is a section along the line 3—3 of Figs. 1, 2, and 5;

Fig. 4 is a section along the line 4—4 of Figs. 1, 2, and 5;

Fig. 5 is a part section along the line 5—5 of Figs. 3 and 4;

Figure 1:
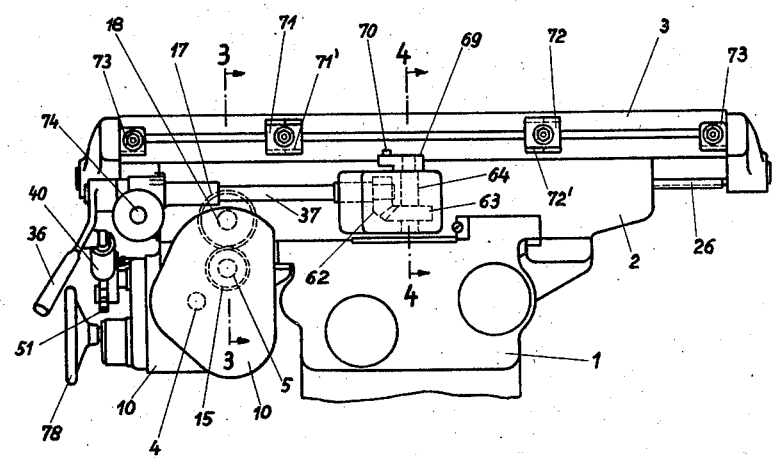
Fig. 1 is an elevation of part of a machine tool.

Referring to the drawings:

On the frame of the machine, or on a suitable bracket 1, is guided a transversely slidable table 2 which carries a longitudinally slidable work-table 3. The movements of the work-table 3 are preferably derived through an articulated main shaft 4 (Fig. 3). For high speed, the main shaft 4 drives an intermediate shaft 5 directly through a pair of gear wheels 6, 7, and for feed speed drives the shaft 5 through a change-speed gear housed in a casing 10, but not shown in the drawings, and a final pair of gear wheels 11, 12. The wheel 7 is fixed to the member 8 of a high-speed clutch 8, 9, and the wheel 12 is secured to the member 13 of the feed clutch 13, 14. The feed clutch 13, 14 and the high-speed clutch 8, 9 are actuated by a common device 16 for altering the speed of the work-table 3. The device 16 is fixed to the member 9 of the high-speed clutch 8, 9 and to the member 14 of the feed clutch 13, 14 and is slidably mounted on the intermediate shaft 5 which is preferably of polygonal cross section. In the extreme right position of the device 16 as shown in Fig. 3 the feed clutch 13, 14 is engaged and the high-speed clutch 8, 9 disengaged. By sliding the device 16 towards the left, the feed clutch 13, 14 is disengaged and the high-speed clutch 8, 9 engaged.

The device 16 carries a gear wheel 15 which meshes with a wheel 17, on a short shaft 18, in both positions of the device 16. The outer end of the shaft 18 carries a bevel wheel 19 which meshes simultaneously with two bevel wheels 20 and 21 (Fig. 5) of a reversing gear. The wheel 20 is provided with a clutch member 20' and the wheel 21 with a clutch member 21'. Both the wheels 20 and 21 are rotatably mounted on a sleeve 35 fixed to a device 22 (formed as a splined shaft) for reversing the direction of movement of the work-table 3.

The device 22 carries a gear wheel 23 which meshes with a wheel 24. The wheel 24 is fixedly connected to a nut 25 (Fig. 4) which, in turning, actuates the spindle 26 attached to the worktable 3 and moves the latter in one or other direction according to the direction of rotation of said nut.

By means of a slot 31 in the device 22 (Fig. 5), an arm 29 of a two-armed lever 28, 29 pivoted on a pin 27, engages a slider 30, by means of which the device 22 can be moved to left and right. Non-rotatably carried on the device 22, on either side of the sleeve 35, are a sleeve 32, bearing a clutch member 32', and a sleeve 34 bearing a clutch member 34'. When the device 22 is moved to the left, the clutch member 32' comes into engagement with the clutch member 21' of the bevel wheel 21. When the device 22 is moved to the right, the sleeve 34 is also carried to the right by projections 33 on the device 22, so that the clutch member 34' engages with the clutch member 20' of the wheel 20. In the central position of the two-armed lever 28, 29 (shown in Fig. 5) and of the device 22, both clutches 32', 21' and 34', 20' are disengaged, so that, when the shaft 18 and wheel 19 are turned, the two bevel wheels 20, 21 only turn in opposite directions on the sleeve 35, whilst the splined shaft 22 and also the work-table 3, remain at rest.

Figure 6:
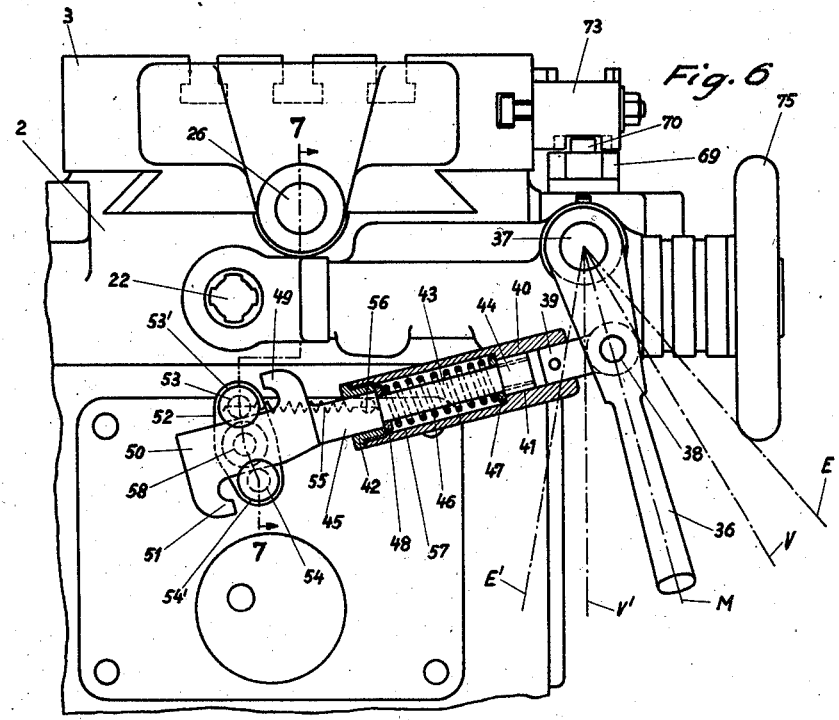
Fig. 6 is a part sectional side elevation.
Figure 7:
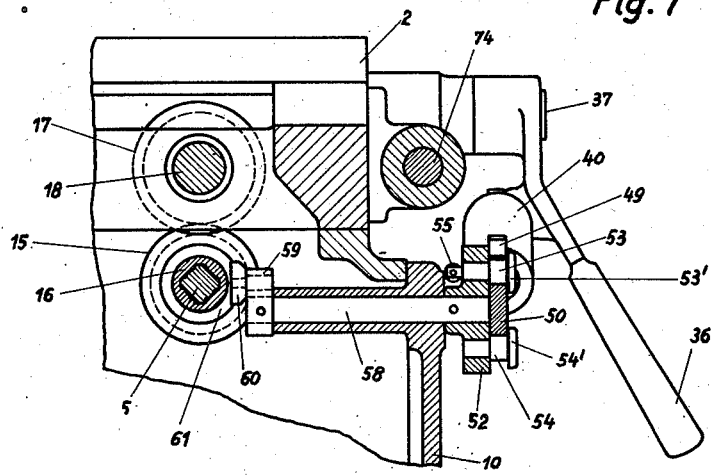
Fig. 7 is a partial section along the line 7—7 of Fig. 6.

The device 16 and two-armed lever 28, 29 are actuated from a common control lever 36 (Figs. 6 and 7). The control lever 36 can be moved from a central position M (Fig. 6) in two opposite directions according to the direction of movement desired of the table 3. The lever 36 is fixed to a shaft 37, mounted in the transverse table 2 by means of which shaft the movements of the lever are transmitted, through intermediate members 62, 63, 65—which will be described hereafter—to the two-armed lever 28, 29, so that in accordance with the direction in which the lever is moved, one or other of the wheels 20, 21 of the reversing gear is coupled with the splined shaft 22 and turns it in one or other direction.

Pivotally attached to the control lever 36 at 38 is a short intermediate member 39 (Fig. 6) to which is secured a sleeve 40 accommodating two guides 42 and 41. In the guide 42 is adapted to move a rod 45, which, by means of a stem 43, carries an extension 44 which moves in the guide 41. Between the rod 45 and extension 44 is a shock absorbing spring 46, preferably under compression, the two ends of which bear against washers 47, 48. The spring 46 and the washers 47, 48 are housed in a recess in the sleeve 40 and carried on the stem 43. When the control lever 36 is in the central position M, the washers 47, 48 bear against the seating in the sleeve 40 and on the opposite end surfaces of the extension 44 and the rod 45. When the control lever 36 is moved to the left (Fig. 6) from its central position M, the sleeve 40 is also pushed towards the left, whereupon, should any resistance be offered by the stem 43, the washer 47 is pushed towards the left and the spring 46 compressed by the extension 44 moving in the guide 41. Similarly, when the control lever 36 is moved to the right, from its central position M, the spring 46 is compressed by means of the end face of the guide 42 and the washer 48, the two guides 41 and 42 sliding over the extension 44 and rod 45, the washer 47 on the right being held in position by bearing against the extension 44 of the stem 43.

The rod 45 is provided with a member 50 (Figs. 6 and 7) which carries on it two setting members 49 and 51 and is guided between two contact members 53 and 54 on a transmission member 52 formed as a two-armed lever. The transmission member 52, the two contact members 53 and 54 and heads 53' and 54' on the latter, form a guide for the member 50 of the rod 45, thus allowing the rod 45 to move in the longitudinal direction when the transmission member 52 is rocked. Said two-armed member transmission 52 is fixed to a spindle 58 mounted in the gear case 10 which is secured on the cross table 2. The other end of the spindle 58 carries a crank member 59 on which is rotatably mounted a slider 60, which engages in an annular groove 61 in the device 16, so that, when the spindle 58 is rotated, the device 16 on the intermediate shaft 5 is pushed in one or the other direction.

The contact member 53 is engaged by a tensioned spring 55, the other end of which is attached to the casing 10 at 56. This spring 55 tends to swing the two-armed lever 52 towards the right (Fig. 6) thereby holding the device 16 in its extreme right-hand position (Fig. 3), in which position the feed clutch 13, 14 is engaged and the high-speed clutch 8, 9 disengaged.

The setting members 49 and 51 of the member 50, when in the position (Fig. 6) corresponding to the central position M of the control lever 36, are at a certain distance from the contact members 53 and 54 of the transmission member 52. When the control lever 36 is moved, from its central position M, to right or left, into one of the inner controlling positions, indicated by the broken lines V and V', the rod 45 is pushed to the left or right, whereupon the member 50 slides between the contact members 53 and 54 on the transmission member 52 and a setting member 49 or 51 merely makes contact with the corresponding contact member 53 or 54. Consequently, this movement of the control lever 36 does not move the transmission member and, therefore, the device 16, out of the position in which both are held by the spring 55.

If the control lever 36 be now moved further to right or left, into one of the outer controlling positions indicated by the broken lines E and E', the rod 45 will also be moved further to the right or left. If the rod 45, and with it the member 50, be pushed into the extreme right-hand position, the setting member 51 bearing against the contact member 54 will swing the transmission member 52 round towards the left (Fig. 6), the device 16 then being pushed to the left, to disengage the feed clutch 13, 14 and engage the high-speed clutch 8, 9. When the rod 45 and member 50 are pushed to the left, the setting member 49 moves the contact member 53, so that the transmission member 52 is also swung round towards the left, and the device 16 is moved in the same position as when the rod 45 was pushed to the right.

The shaft 37 which carries the control lever 36 extends along the cross table 2 in the direction of movement of the work-table 3, and carries, on its other end, at about the middle of the cross table 2, an actuating member 62 (Fig. 1) provided with bevel teeth and meshing with a correspondingly toothed intermediate member 63 (Figs. 1 and 5) provided with journals 64 at both ends and mounted in the cross table 2. A pin 65, controlled by a spring 68, is slidably mounted in a bore 66 in the member 63. The spring 68 in the bore 66 bears against the intermediate member 63 and holds the pin 65 in firm contact against the lateral surfaces of an angular recess 28' in the arm 28 of the two-armed lever 28, 29. When the shaft 37 is turned to left or right (Fig. 6) by the control lever 36, the pin 65 is moved to right or left (Fig. 5) by the members 62 and 63, and thereby swings the two-armed lever 28, 29 in a corresponding direction (Fig. 5) on the pivot pin 27. When one of the clutches 21', 32' and 20', 34' has been thrown into engagement by the rocking movement of the two-armed lever 28, 29 in the manner already described, the pin 65 slides along the sides of the angular recess 28' during the further movement of the control lever 36 and slides in the bore 66 in the intermediate member 63, at the same time compressing the spring 68.

This flexible transmission between the control lever 36 and the two-armed lever 28, 29 may also be replaced by a rigid transmission. In such case, the further movement of the control lever 36—after the corresponding clutch of the reversing gear has been thrown-in—is rendered possible, for example, by designing the clutch members 21', 32', 20', 34' of sufficient length that they permit the splined shaft 22 to be further displaced, even after the clutch has come into effective action.

At the upper end of the vertically disposed journal 64 (Figs. 1 and 2) of the intermediate member 63 is attached a preferably crank-shaped member 69 carrying a striker 70 adapted to coact with setting stops 71, 72 and terminal stops 73 adjustably mounted on the work-table 3.

The apparatus functions in the following manner:

The device 16 is held by the spring 55 (Figs. 6 and 7) in the position shown in Fig. 3, in which position the feed clutch 13, 14 is engaged, until the transmission member 52 is swung, by the control lever 36, in a direction opposing the action of said spring 55. The feed speed the rate of which is controllable by means of a hand wheel 78 (Figs. 1 and 2) and the change speed gear (not shown in the drawing, but housed in the casing 10) is, therefore, already arranged for, even when the control lever 36 is in its central position M.

When the main shaft 4 is started, the lever 36 being in the central position, the two wheels 20 and 21 of the reversing gear turn in opposite directions. The device 22 is stationary, neither of the two clutches 21', 32' and 20', 34' being engaged. With the reversing gear in this position, the position of the work-table 3 can be adjusted by hand, by means of a hand wheel 75. With this object, the wheel 75 turns the device 22, through a shaft 74 and a pair of bevel wheels 76, 77, in the direction of rotation corresponding to the desired direction of movement of the table 3.

For controlling the automatic feed of the table in operation, the control lever 36 is turned from its central position (Fig. 6) into one of the two inner controlling positions V, V', that is into the position V when the work-table 3 is to be moved towards the right (Figs. 1 and 2) and into the position V' when the table is to move towards the left. In this way, the corresponding clutch of the reversing gear is, by means of the setting member 28, 29 engaged, so that the device 22 turns with one of the two wheels 20, 21 and, acting through the driving members 23, 24, 25, 26 moves the work-table 3 at the rate set by the hand wheel 78. Concurrently with the actuation of the two-armed lever 28, 29, the crank member 69 is turned and assumes the inner operative position V or V' shown in Fig. 2. The control lever 36 and the member 69 are retained in the controlling position V or V' corresponding to the direction of feed by, for example, the aid of notches or by the self-locking action of the members 62, 63.

In order that large sections of the work on which no operations are performed by the machine are moved at higher speed instead of at the relatively slow feed speed of the work, the device 16 is actuated, through the rod 45, the setting members 49, 51 (acting on the transmission member 52), the spindle 58, the member 59 and the slider 60, by moving the control lever 36 beyond an inner controlling position V or V', into an outer controlling position E or E' in the manner already described. By this means the feed clutch 13, 14 is disengaged and the high-speed clutch 8, 9 engaged. When the change over from feed to high speed is made, the direction of movement of the work-table 3 remaining unaltered, the mechanism 28 to 34 for reversing remains in the same operative position. Conversely, that is when the direction of movement is changed at the same time, the change over to high speed is effected by passing the control lever through the central position and setting the feed gear so as to move the table 3 in the opposite direction.

The control lever 36 is preferably held in the outer controlling position E or E', for high speed, by hand. On being released, it is returned by the spring 55 into the corresponding inner operative position V or V', for feed speed, the device 16 being also returned at the same time, into its original position for the feed movement.

Figure 2:
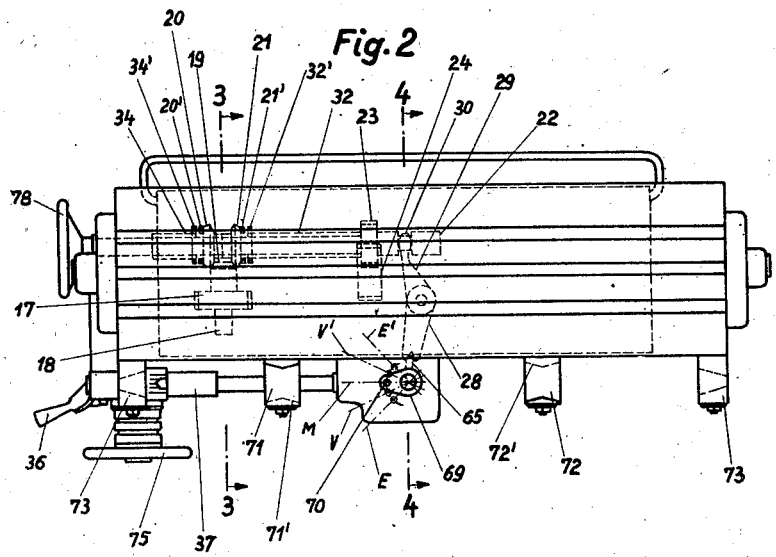
Fig. 2 is a plan of the apparatus shown in Fig. 1.

In moving the control lever 36 into the high-speed position, the member 69 carrying the striker 70 is also moved, and assumes the outer controlling position E or E' shown in Fig. 2. The stops 71 and 72, mounted on the machine are adapted to be adjusted to the points where the work performed by the machine is to start, force the member 69—and therewith the control lever 36, which is held by hand in the outer high-speed controlling position E or E'—by the action of the contact surfaces 71' or 72', on the striker 70, out of the said position and into the controlling position V or V' corresponding to feed speed. This arrangement prevents the work-table 3 from running at high-speed—for example owing to the inattention of the operator—when working operations are to be performed by the machine, and thus damaging the machine or the work.

The terminal stops 73, provided on the right and left of the work-table 3 (Figs. 1 and 2), move the striker 70 back, from the position V or V', into the central position M (Fig. 2), thereby also returning the control lever 36 from the inner controlling position V or V', into the central position M (Fig. 6) and stopping the work-table 3.

That which is claimed is:

1. A machine tool or the like comprising a reciprocating work table, a device for changing the speed of the work table, a device for reversing the direction of motion of the work table, a control lever adjustable in two inner and two outer positions, connecting means between the control lever and one of the said devices for actuating the same during the movement of the control lever only between the two inner positions of the control lever, two setting members operatively connected with the control lever, and two stops connected with the other of the said devices, one of said setting members contacting one of said stops during the movement of the control lever from an inner position to the next outer position, the other setting member contacting the other stop during the movement of the control lever from the other inner position to the next outer position, the other of the said devices being moved by the two stops into the same operative position.

2. A machine tool according to claim 1, in which locking means are provided whereby during the movement of the control lever between an inner and an outer controlling position of the same direction, the second device which is not moved by the two setting members is retained in its existing operative position by the locking means.

3. A machine tool according to claim 1, in which a rod is provided on which the two setting members are carried and the rod being adapted to be moved in its longitudinal direction by the control lever, and the longitudinal movement of the rod taking place under the action of a shock absorbing spring.

4. A machine tool according to claim 1, in which a rod is provided on which the two setting members are carried and the rod being adapted to be moved in its longitudinal direction by the control lever, and the longitudinal movement of the rod taking place under the action of a shock absorbing spring, which is arranged to serve as a shock absorber in both directions of movement of the rod.

5. A machine tool according to claim 1, in which two contact members and a transmission member are provided, so that the two setting members will coact with the two contact members disposed on opposite sides of the pivotal axis of the transmission member and the two setting members being relatively offset in the direction of their movement with respect to the pivoting axis of the transmission member, and the two setting members being spaced in relation to the contact members when the control lever is in the central position.

OTTO PANZNER.